US012517449B2

(12) United States Patent
Tamura

(10) Patent No.: US 12,517,449 B2
(45) Date of Patent: Jan. 6, 2026

(54) TONER CONVEYING DEVICE AND IMAGE FORMING APPARATUS

(71) Applicant: Tomonori Tamura, Kanagawa (JP)

(72) Inventor: Tomonori Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/977,912

(22) Filed: Dec. 11, 2024

(65) Prior Publication Data

US 2025/0199440 A1 Jun. 19, 2025

(30) Foreign Application Priority Data

Dec. 15, 2023 (JP) ................................ 2023-212046

(51) Int. Cl.

| | |
|---|---|
| ***G03G 15/08*** | (2006.01) |
| ***G03G 15/01*** | (2006.01) |
| ***G03G 21/10*** | (2006.01) |
| ***G03G 21/12*** | (2006.01) |

(52) U.S. Cl.

CPC ..... *G03G 15/0891* (2013.01); *G03G 15/0121* (2013.01); *G03G 15/0189* (2013.01); *G03G 21/105* (2013.01); *G03G 21/12* (2013.01); *G03G 2215/0827* (2013.01); *G03G 2221/1624* (2013.01)

(58) Field of Classification Search

CPC ........... G03G 15/0891; G03G 15/0121; G03G 15/0189; G03G 21/105; G03G 21/12; G03G 2215/0827; G03G 2221/1624

See application file for complete search history.

(56) References Cited

U.S. PATENT DOCUMENTS

| | | | | |
|---|---|---|---|---|
| 9,098,049 | B2 * | 8/2015 | Asaoka .............. | G03G 21/0035 |
| 2006/0222408 | A1 * | 10/2006 | Suenami ............ | G03G 15/0822 399/254 |
| 2010/0143011 | A1 | 6/2010 | Tawada | |
| 2017/0261887 | A1 | 9/2017 | Ishizuka et al. | |
| 2022/0197187 | A1 * | 6/2022 | Tsuji .................. | G03G 21/0058 |
| 2023/0367255 | A1 | 11/2023 | Tamura | |

FOREIGN PATENT DOCUMENTS

| | | | |
|---|---|---|---|
| JP | 2005-128203 | A | 5/2005 |
| JP | 2006-267251 | A | 10/2006 |
| JP | 2016-133651 | A | 7/2016 |
| JP | 2023-166964 | A | 11/2023 |

* cited by examiner

*Primary Examiner* — Joseph S Wong
(74) *Attorney, Agent, or Firm* — XSENSUS LLP

(57) ABSTRACT

A toner conveying device includes a drop conveyance passage through which toner falls, an inclined conveyance passage communicating with the drop conveyance passage and extending obliquely downward, a conveyor having a coil shape or a screw shape and disposed in the inclined conveyance passage, and a plurality of flexible sheet having leading ends to contact the conveyor. The leading ends of the plurality of flexible sheets are arranged along a conveyance direction in which the conveyor conveys toner. Adjacent ones of the plurality of flexible sheets are arranged with a clearance larger than a coil pitch or a screw pitch of the conveyor. The clearance is larger between adjacent ones of the plurality of flexible sheets at a position corresponding to an upstream side in the conveyance direction than between adjacent ones of the plurality of flexible sheets at a position corresponding to a downstream side in the conveyance direction.

15 Claims, 6 Drawing Sheets

Z1-Z1
CROSS SECTION

Z2-Z2
CROSS SECTION

Z3-Z3
CROSS SECTION

Z1-Z1
CROSS SECTION

Z2-Z2
CROSS SECTION

Z3-Z3
CROSS SECTION

TONER CONVEYING DEVICE AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-212046, filed on Dec. 15, 2023, in the Japan Patent Office, the entire disclosure of which is hereby incorporated by reference herein.

BACKGROUND

Technical Field

Embodiments of the present disclosure generally relate to a toner conveying device to convey toner such as waste toner, recycle toner, or new toner, and an image forming apparatus, such as a copier, a printer, a facsimile machine, or a multifunction peripheral (MFP) having at least two of such capabilities, incorporating the toner conveying device.

Related Art

Image forming apparatuses, such as a copier and a printer, are known that include a toner conveying device including a drop conveyance passage for causing toner such as waste toner to fall by its own weight and an inclined conveyance passage communicating with a lower end of the drop conveyance passage and extending obliquely downward. In such image forming apparatuses, in order to prevent the toner from being cross-linked in the vicinity of a portion where the drop conveyance passage and the inclined conveyance passage communicate with each other, a technology in which a flexible sheet having a comb-teeth-shape that swings in conjunction with the rotation of an inclined conveying coil installed in the inclined conveyance passage is adopted in the drop conveyance passage.

SUMMARY

In an embodiment of the present disclosure, a toner conveying device includes a drop conveyance passage, an inclined conveyance passage, a conveyor, and a plurality of flexible sheets. Toner falls by own weight of the toner through the drop conveyance passage. The inclined conveyance passage communicates with a lower end of the drop conveyance passage and extending obliquely downward. The conveyor has a coil shape or a screw shape and is disposed in the inclined conveyance passage to rotate in a predetermined direction to convey the toner obliquely downward. Each of the plurality of flexible sheets has a leading end to contact the conveyor to swing in conjunction with rotation of the conveyor. The leading ends of the plurality of flexible sheets are arranged side by side along a conveyance direction in which the conveyor conveys the toner. Adjacent ones of the plurality of flexible sheets adjacent to each other in the conveyance direction are arranged side by side with a clearance in the conveyance direction larger than a coil pitch or a screw pitch of the conveyor. The clearance is larger between adjacent ones of the plurality of flexible sheets adjacent to each other at a position corresponding to an upstream side in the conveyance direction than between adjacent ones of the plurality of flexible sheets adjacent to each other at a position corresponding to a downstream side in the conveyance direction.

In another embodiment of the present disclosure, an image forming apparatus includes the toner conveying device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
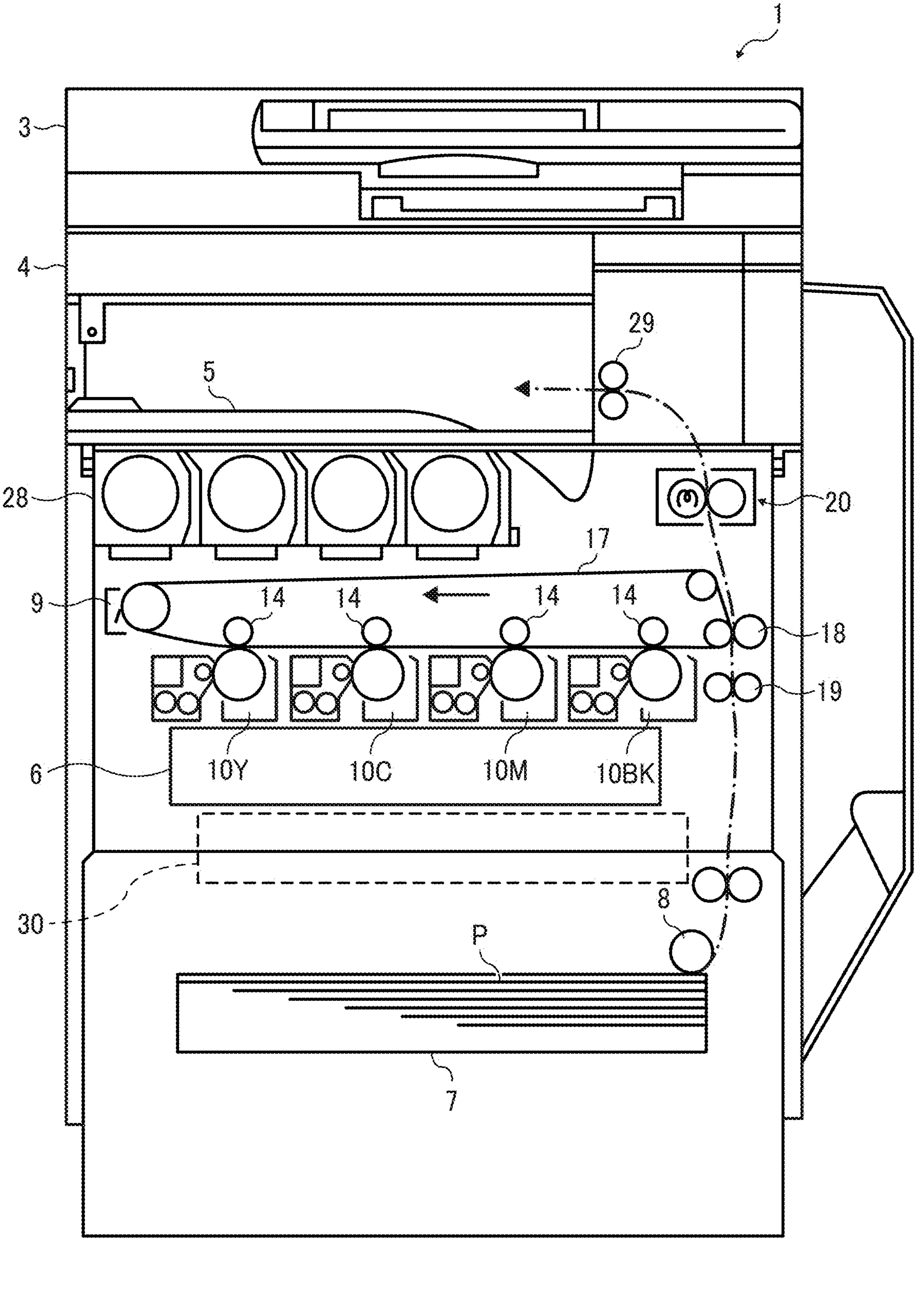
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms "a," "an," and "the" are intended to include the plural forms as well, unless the context clearly indicates otherwise.

A description is given of an overall configuration and operation of an image forming apparatus 1 below with reference to FIG. 1. In FIG. 1, the image forming apparatus 1, which is illustrated as a color copier in the present embodiment, includes a document conveying device 3, a scanner 4 (document reading device), and a writing device 6 (exposure device). The document conveying device 3 conveys documents to the scanner 4. The scanner 4 scans the documents to read image data. The writing device 6 emits a laser beam based on input image data. The image forming apparatus 1 also includes a sheet feeder 7, process cartridges 10Y, 10M, 10C, and 10BK, an intermediate transfer belt 17 (an image bearer), and a secondary transfer roller 18. The sheet feeder 7 stores sheets P such as sheets of paper. The process cartridges 10Y, 10M, 10C, and 10BK are image forming devices to form toner images of yellow, magenta, cyan, and black, respectively. The toner images of multiple colors are transferred and superimposed one on another onto the intermediate transfer belt 17. The secondary transfer roller 18 transfers the toner images on the intermediate transfer belt 17 onto the sheet P. The image forming apparatus 1 further includes a fixing device 20, toner containers 28, and a waste-toner collection container 30. The fixing device 20 fixes unfixed toner images on the sheet P. The toner containers 28 contain toners of respective colors to be supplied to developing devices 13 of the corresponding process cartridges 10Y, 10M, 10C, and 10BK. Waste-toner is collected in the waste-toner collection container 30.

Figure 2:
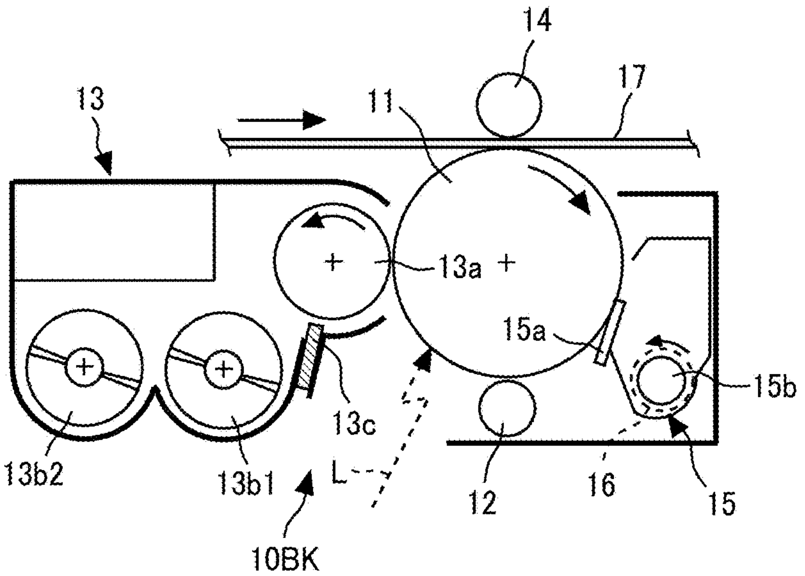
FIG. 2 is a schematic view of an image forming device.

Each of the process cartridges 10Y, 10M, 10C, and 10BK (serving as image forming devices) includes a photoconductor drum 11 (serving as an image bearer), a charging device 12, the developing device 13, and a cleaning device 15, which are integrated as a single unit as illustrated in FIG. 2. Each of the process cartridges 10Y, 10M, 10C, and 10BK, which is expendable, is replaced with a new one when depleted. Yellow, magenta, cyan, and black toner images are formed on the respective photoconductor drums 11 (serving as image bearers) in the process cartridges 10Y, 10M, 10C, and 10BK.

A description is given below of operations of the image forming apparatus 1 to form a normal color toner image. Conveying rollers of the document conveying device 3 convey a document on a document table onto an exposure glass of the scanner 4. The scanner 4 optically scans the document on the exposure glass to read image data. The yellow, magenta, cyan, and black image data are transmitted to the writing device 6. The writing device 6 irradiates the photoconductor drums 11 of the corresponding process cartridges 10Y, 10M, 10C, and 10BK with laser beams L (exposure light) based on the yellow, magenta, cyan, and black image data, respectively.

Meanwhile, the four photoconductor drums 11 rotate clockwise as illustrated in FIGS. 1 and 2. With reference to FIG. 2, the charging device 12 (charging roller) uniformly charges a surface of the photoconductor drum 11 at a position opposite the photoconductor drum 11 (charging process). Thus, the surface of the photoconductor drum 11 is charged to a certain potential. Subsequently, the surface of the photoconductor drum 11 thus charged reaches a position where the surface of the photoconductor drum 11 is irradiated with the laser beam L. The writing device 6 emits the laser beams L for respective colors from a light source according to the image data of respective colors. The laser beams L are reflected by a polygon mirror and transmitted through multiple lenses. The laser beams L transmitted through the multiple lenses passes through different optical passages for the different color components of yellow, magenta, cyan, and black (exposure process).

The laser beam L corresponding to the yellow image data is emitted to the surface of the photoconductor drum 11 in the first process cartridge 10Y from the left among the four process cartridges 10Y, 10M, 10C, and 10BK in FIG. 1. Thus, an electrostatic latent image for yellow is formed on the photoconductor drum 11 charged by the charging device 12 (charging roller). Similarly, the laser beam L corresponding to the cyan image data is emitted to the surface of the photoconductor drum 11 in the second process cartridge 10C from the left in FIG. 1, thus forming an electrostatic latent image corresponding to the cyan image data on the surface of the photoconductor drum 11. The laser beam L corresponding to the magenta image data is emitted to the surface of the photoconductor drum 11 in the third process cartridge 10M from the left in FIG. 1, thus forming an electrostatic latent image corresponding to the magenta image data on the surface of the photoconductor drum 11. The laser beam L corresponding to black image data is emitted to the surface of the photoconductor drum 11 in the fourth process cartridge 10BK from the left in FIG. 1, thus forming an electrostatic latent image corresponding to the black image data on the surface of the photoconductor drum 11.

Then, the surface of the photoconductor drum 11 bearing the electrostatic latent image for each color reaches the position opposite the developing device 13 (see FIG. 2). The developing device 13 supplies toner of each color onto the surface of the photoconductor drum 11 and develops the electrostatic latent image on the photoconductor drum 11 into a toner image (development process). Subsequently, the surface of the photoconductor drum 11 after the development process reaches a position opposite the intermediate transfer belt 17 (intermediate transferor) as image bearer. Each of primary transfer rollers 14 is disposed at the position where the surface of the photoconductor drum 11 faces the intermediate transfer belt 17 such that the primary transfer roller 14 contacts an inner circumferential surface of the intermediate transfer belt 17. At the positions of the primary transfer rollers 14, the toner images on the photoconductor drums 11 are sequentially transferred and superimposed onto the intermediate transfer belt 17, forming a multicolor toner image thereon (primary transfer process).

After the primary transfer process, the surface of the photoconductor drum 11 reaches the position opposite the cleaning device 15 (see FIG. 2). The cleaning device 15 collects untransferred toner remaining on the photoconductor drum 11 (cleaning process). Then, the surface of the photoconductor drum 11 passes through a charge elimination device to complete a series of image forming processes performed on the photoconductor drum 11.

Meanwhile, the surface of the intermediate transfer belt 17, onto which the single-color toner images on the photoconductor drums 11 are transferred and superimposed, moves in a direction indicated by an arrow in FIG. 1 and reaches a position opposite a secondary transfer roller 18.

The secondary transfer roller 18 secondarily transfers the multicolor toner image on the intermediate transfer belt 17 onto the sheet P (secondary transfer process). After the secondary transfer process, the surface of the intermediate transfer belt 17 reaches a position opposite an intermediate transfer belt cleaner 9 (a cleaning device for the intermediate transfer belt 17). The intermediate transfer belt cleaner 9 collects the untransferred toner on the intermediate transfer belt 17 to complete a series of transfer processes on the intermediate transfer belt 17.

The sheet P is conveyed from the sheet feeder 7 to the position of the secondary transfer roller 18 via, for example, a sheet conveyance guide and a registration roller pair 19. More specifically, a feed roller 8 feeds the sheet P from the sheet feeder 7 that stores a stack of sheets P, and the sheet P is then guided by the sheet conveyance guide to the registration roller pair 19. The sheet P that has reached the registration roller pair 19 is conveyed toward the position of the secondary transfer roller 18 so that the sheet P coincides with the arrival of the multicolor toner image on the intermediate transfer belt 17.

Subsequently, the sheet P, onto which the multicolor image is transferred, is conveyed to a fixing device 20. The fixing device 20 includes a fixing roller and a pressure roller pressing against each other. In a nip between the fixing roller and the pressure roller, the multicolor toner image is fixed on the sheet P. After the fixing process, an output roller pair 29 ejects the sheet P as an output image to the exterior of a body of the image forming apparatus 1, and the ejected sheets P are stacked on an output tray 5 to complete a series of image forming processes.

Next, with reference to FIG. 2, image forming devices of the image forming apparatus 1 are described in detail below. FIG. 2 is a schematic view of the process cartridge 10BK for black. The other three process cartridges 10Y, 10M, and 10C have a similar configuration as the process cartridge 10BK for black except for the color of toner used in the image forming process, and thus drawings and descriptions thereof are omitted to avoid redundancy.

As illustrated in FIG. 2, the process cartridge 10BK is a single unit that includes the photoconductor drum 11 as the image bearer, the charging device 12 to charge the photoconductor drum 11, the developing device 13 to develop the electrostatic latent image on the photoconductor drum 11, and the cleaning device 15 to remove the untransferred toner from the photoconductor drum 11 in a casing of the process cartridge 10BK.

The photoconductor drum 11 is an organic photoconductor designed to be charged with a negative polarity and includes a photosensitive layer formed on a drum-shaped conductive support. The charging device 12 is a charging roller including a conductive core and an elastic layer of moderate resistivity overlaid on the conductive core. A power supply applies a specified voltage to the charging device 12 (charging roller). Thus, the charging device 12 uniformly charges the surface of the photoconductor drum 11 facing the charging device 12.

The developing device 13 includes a developing roller 13*a* disposed opposite the photoconductor drum 11, a first conveying screw 13*b*1 disposed opposite the developing roller 13*a*, a second conveying screw 13*b*2 disposed opposite the first conveying screw 13*b*1 via a partition, and a doctor blade 13*c* disposed opposite the developing roller 13*a*. The developing roller 13*a* includes multiple magnets and a sleeve that rotates around the magnets. The magnets are stationary and generate magnetic poles around the circumferential surface of the developing roller 13*a*. The magnets generate a plurality of magnetic poles on the developing roller 13*a* (sleeve) to bear developer on the developing roller 13*a*. The developing device 13 stores two-component developer including carrier and toner.

The cleaning device 15 includes a cleaning blade 15*a* that contacts the photoconductor drum 11 and a conveying screw 15*b* (a conveyance tube 16) that conveys the untransferred toner collected in the cleaning device 15 toward a waste-toner conveying device 40 (see FIG. 3) as waste toner. For example, the cleaning blade 15*a* is made of rubber, such as urethane rubber, and contacts the surface of the photoconductor drum 11 at a specified angle with a specified pressure. With such a configuration, substances such as the untransferred toner adhering to the photoconductor drum 11 are mechanically scraped off and collected in the cleaning device 15. The untransferred toner collected in the cleaning device 15 is conveyed to the waste-toner conveying device 40 (see FIG. 3) as the toner conveying device via the conveyance tube 16 in which the conveying screw 15*b* is disposed and conveyed to the waste-toner collection container 30 by the waste-toner conveying device 40. The conveyed untransferred toner is collected in the waste-toner collection container 30 as the waste toner. Similarly, with reference to FIG. 1, the intermediate transfer belt cleaner 9 as a cleaning device also includes a cleaning blade and a conveying screw. The cleaning blade contacts the intermediate transfer belt 17. The conveying screw (conveyance tube 16) conveys the untransferred toner collected in the intermediate transfer belt cleaner 9 toward the waste-toner conveying device 40 (see FIG. 3) as waste toner. The untransferred toner collected in the intermediate transfer belt cleaner 9 is conveyed to the waste-toner conveying device 40 (see FIG. 3) as the developer conveying device via the conveyance tube 16 in which a conveying screw is disposed and conveyed to the waste-toner collection container 30 by the waste-toner conveying device 40. The conveyed untransferred toner is collected in the waste-toner collection container 30 as the waste toner. A description is given of the waste-toner conveying device 40 in further detail below. In addition to the untransferred toner, substances adhering to the photoconductor drum 11 or the intermediate transfer belt 17 include, for example, paper dust resulting from the sheet P, discharge products generated on the photoconductor drum 11 during discharge by the charging device 12, and additives to the toner. In the present specification, such substances are collectively referred to as the "untransferred toner."

The image forming processes, described above, are described in further detail below with reference to FIG. 2. The developing roller 13*a* rotates in a direction (counterclockwise) indicated by an arrow in FIG. 2. In the developing device 13, as the first conveying screw 13*b*1 and the second conveying screw 13*b*2 arranged via the partition rotate, the developer is circulated in the longitudinal direction of the developing device 13, while being stirred and mixed with toner supplied from the toner container 28 by a toner supply device. The longitudinal direction of the developing device 13 is perpendicular to the plane on which FIG. 2 is illustrated.

Thus, the toner is triboelectrically charged and attracted to the carrier. The toner is borne on the developing roller 13*a* together with the carrier. The developer borne on the developing roller 13*a* reaches a position opposite the doctor blade 13*c*. After having been adjusted to an appropriate amount at the position of the doctor blade 13*c*, the developer on the developing roller 13*a* then reaches an opposing position to the photoconductor drum 11 (i.e., a development area). In the development area, the toner in the developer adheres to the electrostatic latent image formed on the surface of the photoconductor drum 11. The toner adheres to the electrostatic latent image (i.e., the toner image is formed) by a development electric field formed by a potential difference (i.e., a developing potential) between a latent image potential (i.e., an exposure potential) of an image area irradiated with the laser beam L and a development bias applied to the developing roller 13*a*. Subsequently, most of the toner attached to the photoconductor drum 11 in the developing process is transferred onto the intermediate transfer belt 17. The untransferred toner remained on the surface of the photoconductor drum 11 is collected in the cleaning device 15 by the cleaning blade 15*a*.

Figure 3:
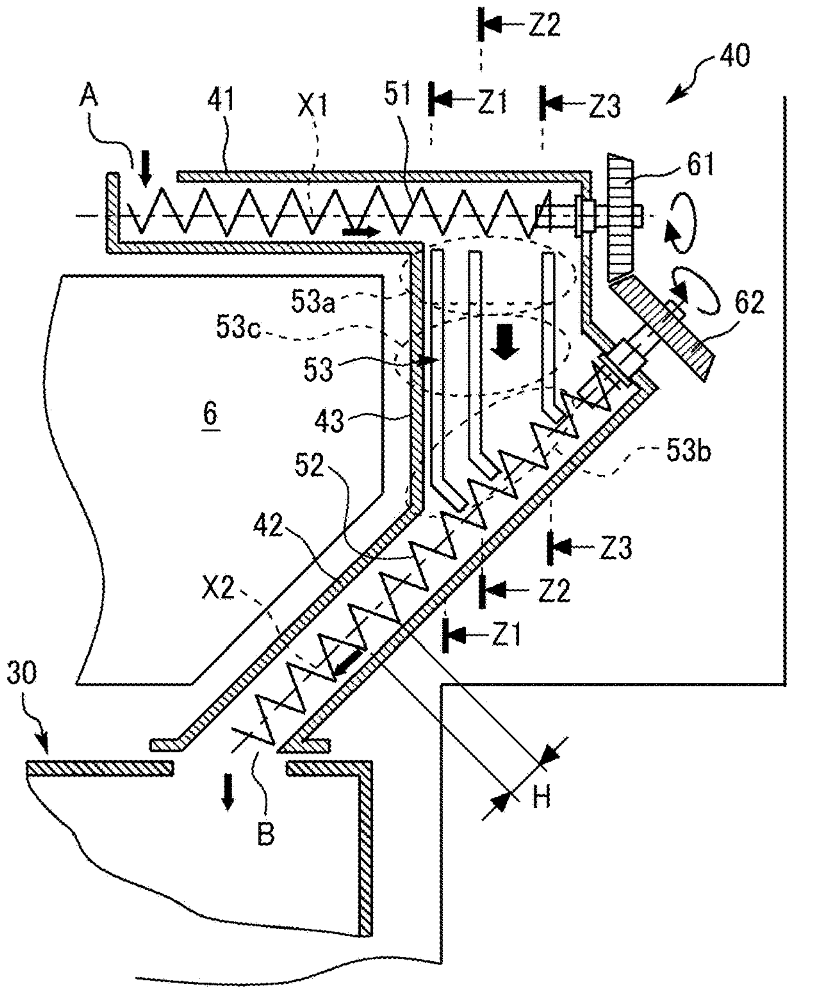
FIG. 3 is a cross-sectional view of a waste-toner conveying device.

A description is given in detail below of the waste-toner conveying device 40 as the toner conveying device of the image forming apparatus 1 according to the present embodiment. With reference to FIG. 3, waste toner as the toner (developer) are collected by the plurality of cleaning devices 15 and the intermediate transfer belt cleaner 9 and flow into the waste-toner conveying device 40 from an inlet port A via the conveyance tube 16. The waste-toner conveying device 40 as the toner conveying device discharges the waste toner toward the waste-toner collection container 30 from an outlet port B. Specifically, the waste toner (toner) is conveyed in a direction indicated by a black arrow in FIG. 3 in the waste-toner conveying device 40. The waste-toner collection container 30 is detachably (replaceably) attached in the body of the image forming apparatus 1. When the waste-toner collection container 30 is attached to the body of the image forming apparatus 1, the waste-toner collection container 30 is communicatively coupled with the waste-toner conveying device 40 (an inclined conveyance passage 42). The waste toner that has been conveyed by the waste-toner conveying device 40 is collected in the waste-toner collection container 30.

As illustrated in FIGS. 3, 4A, 4B, and 4C, the waste-toner conveying device 40 (toner conveying device) includes a horizontal conveyance passage 41, a drop conveyance passage 43, and the inclined conveyance passage 42 along the conveyance direction of the waste toner indicated by a black arrow. The inlet port A is disposed at a top portion of the horizontal conveyance passage 41 on the upstream side of the horizontal conveyance passage 41 in the conveyance direction. The outlet port B is disposed at a bottom portion of the inclined conveyance passage 42 on the downstream side of the inclined conveyance passage 42 in the conveyance direction. Since there is a layout limitation in the body of the image forming apparatus 1, the waste-toner conveying device 40 is formed by combining a plurality of conveyance passages extending in different directions instead of a conveyance passage directly coupled with the inlet port A and the outlet port B. Specifically, in the present embodiment, as illustrated in FIG. 3, the horizontal conveyance passage 41, the drop conveyance passage 43, and the inclined conveyance passage 42 are disposed to avoid the writing device 6 located above the waste-toner collection container 30 in the image forming apparatus 1.

The drop conveyance passage 43, in which waste toner (toner) falls by its own weight, extends in a substantially vertical direction in the present embodiment. The drop conveyance passage 43 in the present embodiment is formed so that the horizontal cross section is rectangular. A flexible sheet 53 (see FIGS. 3, 4A, 4B, 4C, 5A, and 5B) for preventing cross-link of the toner in the conveyance passage is disposed in the drop conveyance passage 43, which is described in detail later. In the present embodiment, the drop conveyance passage 43 extends in the substantially vertical direction. Alternatively, a drop conveyance passage can be used that has any shape allowing waste toner to fall by its own weight. For example, a drop conveyance passage can be used that has a shape allowing toner to slide down on an inclined surface inclined relative to the vertical direction to fall by its own weight.

The inclined conveyance passage 42 communicates with a lower end (a portion surrounded by a broken line in FIG. 3) of the drop conveyance passage 43 and extends obliquely downward (a direction from the upper right to the lower left in FIG. 3). In other words, the inclined conveyance passage 42 is disposed to intersect with the drop conveyance passage 43 at a specified inclination angle. In the present embodiment, the inclined conveyance passage 42 is substantially cylindrical.

An inclined conveying coil 52 as a conveyor (first conveyor) having a coil shape that rotates in a specified direction to convey waste toner (toner) obliquely downward is disposed in the inclined conveyance passage 42. With reference to FIGS. 3, 4A, 4B, and 4C, the inclined conveying coil 52 serving as a conveyor is made of a metal material. An upstream end (upper right end in FIG. 3) of a coil portion spirally wound in a specified direction is joined to a shaft of the inclined conveying coil 52 by welding. A bevel gear 62 is disposed on the shaft of the inclined conveying coil 52 by welding. The bevel gear 62 meshes with a bevel gear 61 of a horizontal conveying coil 51 described below and rotates the inclined conveying coil 52 in the direction indicated by an arrow in FIGS. 3, 4A, 4B, and 4C around a rotation center X2 with a rotation drive of the horizontal conveying coil 51 by a motor. Note that when the inclined conveying coil 52 rotates in the direction indicated by an arrow in FIGS. 4A, 4B, and 4C (counterclockwise direction), a flexible sheet 53 (53A to 53C) described below is raised in a direction away from projections 43*b* (43*b*1 to 43*b*3) by contact with the inclined conveying coil 52. Thus, the flexible sheet 53 (53A to 53C) described below swings efficiently.

On the other hand, the horizontal conveyance passage 41 communicates with an upper end of the drop conveyance passage 43 and extends in a horizontal direction (a direction from left to right in FIG. 3). In other words, the horizontal conveyance passage 41 is disposed to intersect the drop conveyance passage 43 in the horizontal direction. In the present embodiment, the horizontal conveyance passage 41 is formed in a substantially cylindrical shape.

Figure 6A:
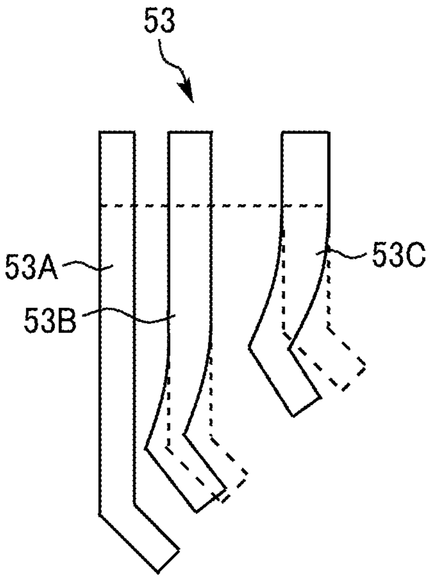
FIG. 6A is a diagram illustrating a state in which the flexible sheet of FIG. 5A is deformed by contact with an inclined conveying coil.
Figure 6B:
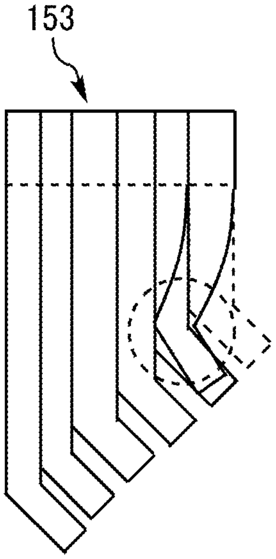
FIG. 6B is a diagram illustrating a state in which a flexible sheet as a comparative example is deformed by contact with the inclined conveying coil.

The horizontal conveying coil 51 as a second conveyor having a coil shape is disposed in the horizontal conveyance passage 41. The horizontal conveying coil 51 rotates in a specified direction and conveys waste toner (toner) in the horizontal direction. With reference to FIGS. 3, 6A, and 6B, the horizontal conveying coil 51 serving as a second conveyor is made of a metal material. An upstream end (right end in FIG. 3) of a coil portion spirally wound in a specified direction is joined to a shaft of the horizontal conveying coil 51 by welding. The bevel gear 61 is disposed on the shaft of the horizontal conveying coil 51 by welding. The horizontal conveying coil 51 rotates in the direction indicated by the arrow in FIGS. 3, 4A, 4B, and 4C around a rotation center X1 by being driven by a motor. As the horizontal conveying coil 51 rotates in the direction indicated by an arrow in FIGS. 4A, 4B, and 4C (clockwise direction), the waste toner conveyed by the horizontal conveying coil 51 in the horizontal conveyance passage 41 falls by its own weight along a side of the flexible sheet 53 (or an inner wall 43*a*) described below in the drop conveyance passage 43.

With reference to FIGS. 3, 4A, 4B, and 4C, the flexible sheet 53 is disposed in the drop conveyance passage 43 of the waste-toner conveying device 40 (toner conveying device) according to the present embodiment and disposed such that a leading end 53*b* (in the present embodiment, a bent portion of the flexible sheet 53) can contact the inclined conveying coil 52 (conveyor). As indicated by a double-headed arrow in FIGS. 4A, 4B, and 4C, the flexible sheet 53 swings in conjunction with the rotation of the inclined conveying coil 52 (conveyor). In other words, as the inclined conveying coil 52 rotates together with the horizontal conveying coil 51 with the operation of the waste-toner conveying device 40, the leading end 53*b* (lower end as a free end) of the flexible sheet 53 repeats contact and non-contact against the coil portion of the inclined conveying coil 52. Thus, the flexible sheet 53 swings. In particular, the leading end 53*b* of the flexible sheet 53 greatly swings at the communicating portion between the drop conveyance passage 43 and the inclined conveyance passage 42.

The flexible sheet 53 having such a configuration is disposed in the waste-toner conveying device 40 in the present embodiment. Even in a case where the inclined conveyance passage 42 extending obliquely downward is disposed to communicate with the lower end of the drop conveyance passage 43, toner is scraped and crumbled by the flexible sheet 53 even if the toner tends to condense in the vicinity of a portion where the drop conveyance passage 43 and the inclined conveyance passage 42 communicate with each other. Thus, the cross-linking of toner is less likely to occur. Accordingly, toner conveyance failure due to occurrence of the toner cross-linking is less likely to occur. In particular, waste toner is likely to cause the toner cross-linking than new toner (fresh toner). Thus, the configuration of the present embodiment is useful. As described above, waste toner falls by its own weight along the flexible sheet 53 in the drop conveyance passage 43, the waste toner is likely to adhere to the flexible sheet 53. However, the flexible sheet 53 itself is actively swung, so that the adhesion of the toner to the flexible sheet 53 is less likely to occur. The flexible sheet 53 is a relatively inexpensive and lightweight member and repeats contact and non-contact with the inclined conveying coil 52 to swing without having a dedicated drive source for swinging. Accordingly, the device has a relatively simple configuration.

In the present embodiment, the flexible sheet 53 is made of, for example, polyethylene terephthalate (PET) having a sheet thickness of 0.2 mm or more (in the present embodiment, a sheet thickness of about 0.3 to 0.8 mm). When the sheet thickness is less than 0.05 mm, the function of crumbling toner by swing of the flexible sheet 53 decreases. When the thickness of the sheet is thicker than 0.05 mm, the function of crumbling the toner during swinging of the flexible sheet 53 increases as the thickness of the sheet is increased. When the sheet thickness is 0.2 mm or more and a plurality of flexible sheets are arranged side by side without any clearance as described later with reference to FIGS. 6A and 6B, the flexible sheets interfere with each other, so that the sound generated when the flexible sheets are flipped becomes loud (abnormal sound is generated). In the present embodiment, even when the sheet thickness is set to 0.2 mm or more, the plurality of flexible sheets 53A to 53C are arranged in parallel with the clearances D1 and D2 therebetween so that such abnormal sound does not occur. A description is given of this configuration in detail later.

With reference to FIGS. 3, 4A, 4B, 4C, 5A, and 5B, in the present embodiment, the flexible sheet 53 (53A to 53C) extends in the vertical direction and an upper end 53*a* of the flexible sheet 53 is fixed as a fixed end to the inner wall 43*a* of the drop conveyance passage 43 such that the leading end 53*b* as a lower end of the flexible sheet 53 is a free end. Specifically, in the present embodiment, the upper end 53*a* of the flexible sheet 53 (53A to 53C) is bonded (cantilevered) to the inner wall 43*a* with a double-sided tape. As illustrated in FIG. 3, the inclined conveyance passage 42 extends obliquely downward with a specified inclination angle θ when viewed from a direction opposite the inner wall 43*a* of the drop conveyance passage 43.

Figure 4A:
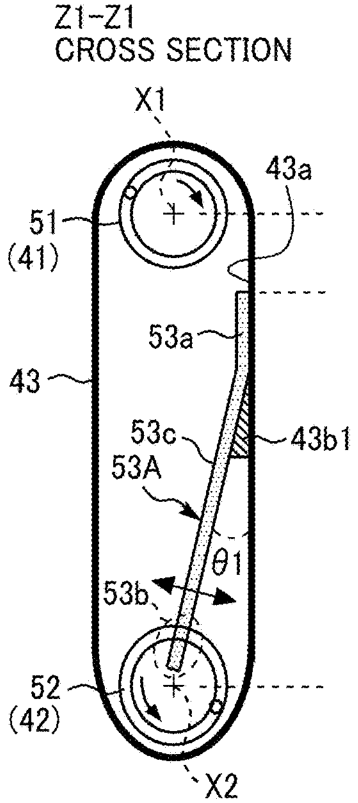
FIG. 4A is a diagram illustrating a Z1-Z1 cross section of a waste-toner conveying device in FIG. 3.
Figure 4B:
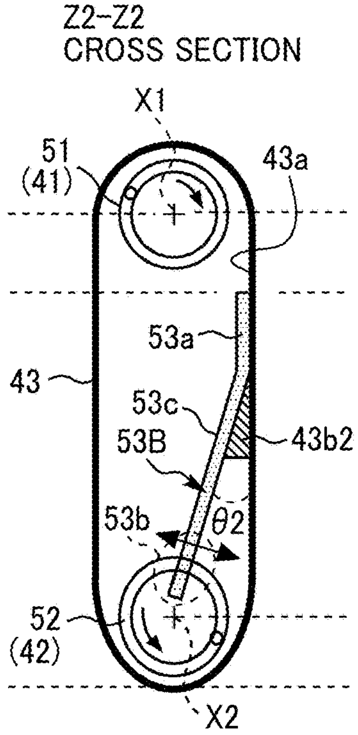
FIG. 4B is a diagram illustrating a Z2-Z2 cross section of the waste-toner conveying device in FIG. 3.
Figure 4C:
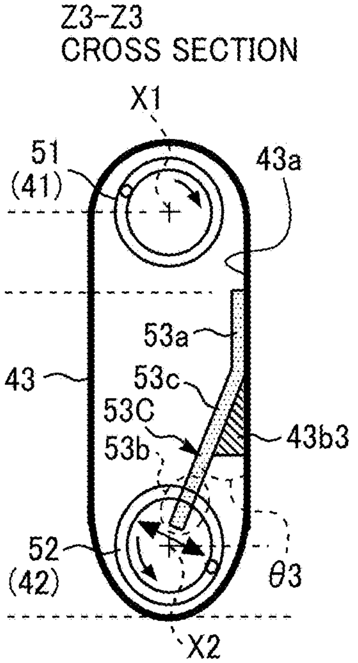
FIG. 4C is a diagram illustrating a Z3-Z3 cross section of the waste-toner conveying device in FIG. 3.

In the present embodiment, as illustrated in FIGS. 4A, 4B, and 4C (and FIGS. 5A and 5B), a plurality of projections 43*b* (43*b*1 to 43*b*3) are disposed on the inner wall 43*a* of the drop conveyance passage 43. The projection 43*b* (43*b*1 to 43*b*3) inclines a portion of the flexible sheet 53 (53A to 53C) except the upper end 53*a* (the fixed end fixed to the inner wall 43*a* of the drop conveyance passage 43) downward in a direction away from the inner wall 43*a* such that the leading end 53*b* as a free end of the flexible sheet 53 (53A to 53C) faces the rotation center X2 of the inclined conveying coil 52 (conveyor). Specifically, as illustrated in FIGS. 4A, 4B, and 4C, the projection 43*b* (43*b*1 to 43*b*3) has an inclined surface formed to be inclined in a direction away from the inner wall 43*a* from the upper portion toward the bottom portion. Assuming that the flexible sheet 53 does not contact the inclined conveying coil 52 (or the inclined conveying coil 52 is not disposed), the flexible sheet 53 inclines along an inclined surface of the projection 43*b*. Thus, the leading end 53*b* of the flexible sheet 53 faces the rotation center X2 of the inclined conveying coil 52.

Figure 7A:
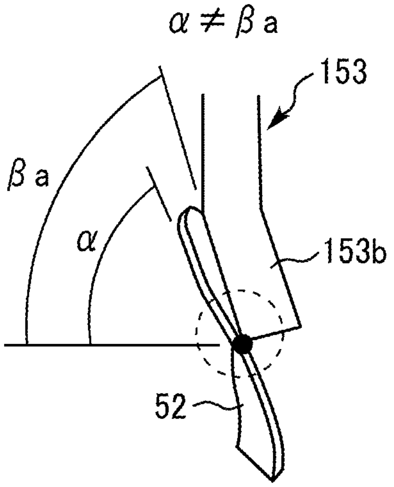
FIGS. 7A and 7B are enlarged views of flexible sheets, each illustrating a state in which a leading end of the flexible sheet contacts an inclined conveying coil.
Figure 7B:
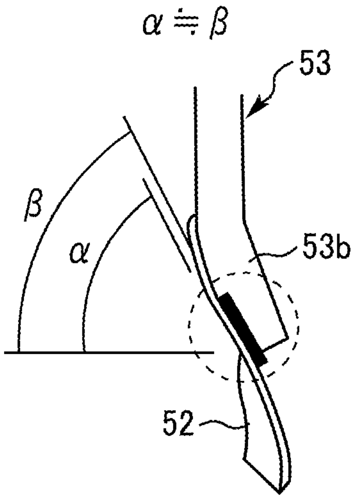

More specifically, as illustrated in FIGS. 4A, 4B, and 4C, the flexible sheet 53 (53A to 53C) has the upper end 53*a*, a body portion 53*c*, and the leading end 53*b* (lower end). As illustrated in FIG. 3, the body portion 53*c* extends vertically downward from the upper end 53*a* when viewed from a direction opposite the inner wall 43*a* as illustrated in FIG. 3. The body portion 53*c* extends lower left from the upper end 53*a* when viewed from a lateral side as in FIGS. 4A, 4B, and 4C. On the other hand, as illustrated in FIGS. 3, 5A, 5B, and 7B, the leading end 53*b* (lower end) is bent from a lower end of the body portion 53*c* along the inclination with respect to the rotation center X2 of the inclined conveying coil 52 (conveyor). In other words, as illustrated in FIG. 7B, the inclination angle β of the leading end 53*b* with respect to the rotation center X2 is substantially equal ($\alpha \approx \beta$) to the inclination angle α of the inclined conveying coil 52 with respect to the rotation center X2 of the coil. Accordingly, the leading end 53*b* is likely to contact the coil portion of the inclined conveying coil 52, and the sound (abnormal sound) when the flexible sheet 53 is flipped by the inclined conveying coil 52 is reduced compared to a flexible sheet 153, which is illustrated as a comparative example in FIG. 7A, configured such that a leading end 153*b* makes point contact with the coil portion ($\alpha \neq \beta a$).

Figure 5A:
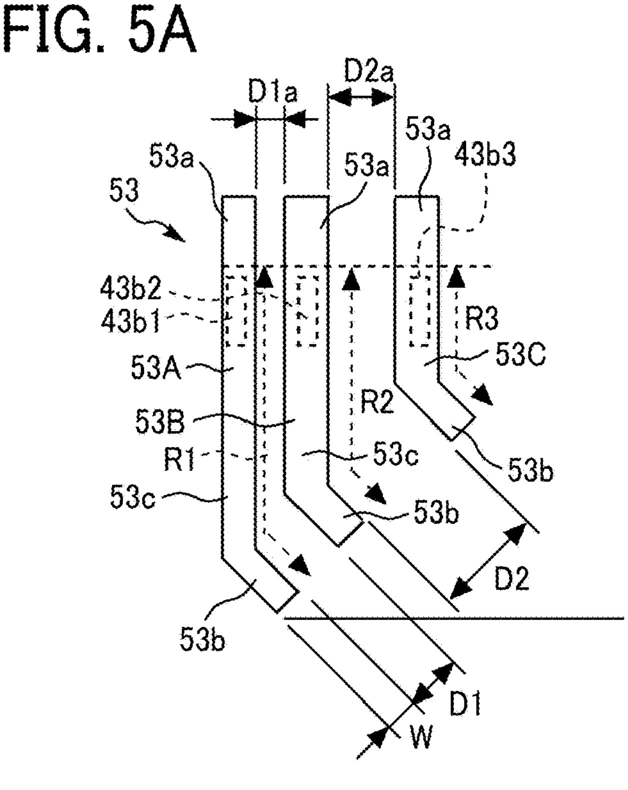
FIGS. 5A and 5B are front views of flexible sheets and positions at which projections contact the flexible sheets.
Figure 5B:
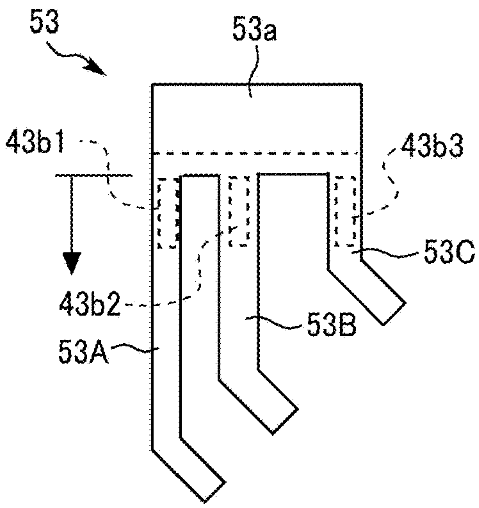

As illustrated in FIGS. 3, 4A, 4B, 4C, and 5A, a plurality of flexible sheets 53A to 53C (three flexible sheets in the present embodiment) is provided as the flexible sheet 53 such that the plurality of leading ends 53*b* (three leading ends 53*b* in the present embodiment) are aligned along the conveyance direction (obliquely downward in FIG. 3) of the inclined conveying coil 52. The upper ends 53*a* of the plurality of flexible sheets 53A to 53C are bonded to the inner wall 43*a* at the same height position (adjacent to the connecting portion between the horizontal conveyance passage 41 and the drop conveyance passage 43). With reference to FIGS. 5A and 5B, a plurality of projections 43*b* are arranged to correspond to the plurality of flexible sheets 53A to 53C.

Specifically, with reference to FIGS. 3, 5A, and 5B, the plurality of flexible sheets 53A to 53C are formed such that the sheet length (the length from a fixed end to a free end) of a flexible sheet located at a position corresponding to an upstream side in the conveyance direction (a direction from upper right to lower left in FIG. 3) is shorter than the sheet length of a flexible sheet located at a position corresponding to a downstream side in the conveyance direction (R1>R2>R3). More particularly, with reference to FIGS. 5A and 5B, the sheet length is shorter in the order of a first flexible sheet 53A, a second flexible sheet 53B, and a third flexible sheet 53C.

The plurality of projections 43*b* are formed such that the projection height (a height of a lower portion thereof and a height in a direction away from the inner wall 43*a*) of a projection located at a position corresponding to an upstream side in the conveyance direction (a direction from upper right to lower left in FIG. 3) is higher than the projection height of a projection located at a position corresponding to a downstream side in the conveyance direction. Specifically, with reference to FIGS. 4A, 4B, and 4C, the projection height of the downstream projection 43*b* illustrated in FIG. 4A is lower than the projection height of the midstream projection 43*b* illustrated in FIG. 4B. The projection height of the midstream projection 43*b* illustrated in FIG. 4B is lower than the projection height of the upstream projection 43*b* illustrated in FIG. 4C. As a result, an inclination angle θ1 of the first flexible sheet 53A on the downstream side illustrated in FIG. 4A is smaller than an inclination angle θ2 of the second flexible sheet 53B on the midstream side illustrated in FIG. 4B. The inclination angle θ2 of the second flexible sheet 53B on the midstream side illustrated in FIG. 4B is smaller than an inclination angle θ3 of the third flexible sheet 53C on the upstream side illustrated in FIG. 4C (θ1<θ2<θ3). Note that the above-described inclination angles θ1 to θ3 are angles formed by the inner wall 43*a* of the drop conveyance passage 43 and the body portion 53*c* of the flexible sheets 53A to 53C when viewed in a cross section orthogonal to the rotation axis of the horizontal conveying coil 51. With such a configuration, the plurality of flexible sheets 53A to 53C that have the upper ends 53*a* fixed at the same height position and are different in length uniformly head to the rotation center X2 of the inclined conveying coil 52. Accordingly, the plurality of flexible sheets 53A to 53C smoothly swing in conjunction with rotation of the inclined conveying coil 52. Thus, toner cross-linking is efficiently reduced.

Note that in the present embodiment, as illustrated in FIG. 5B, the plurality of flexible sheets 53A to 53C can be united with each other such that the upper ends 53*a* (the fixed ends) thereof are located at the same height positions. That is, the flexible sheet 53 can be formed into a comb shape as a single member so that the portion other than the upper end 53*a* is constituted of the flexible sheets 53A to 53C divided into a plurality of portions. When the flexible sheet 53 is formed into a comb shape as described above, the number of components can be reduced, and assemblability in an apparatus can be enhanced, as compared with a case where each of the plurality of flexible sheets 53A to 53C is formed as an independent component as illustrated in FIG. 5A. In the present embodiment, the number of flexible sheets in the plurality of flexible sheets 53A to 53C is three and the number of projections in the plurality of projections 43*b* is three. However, the number of flexible sheets and the number of projections are not limited to three. In the example of FIG. 5B, the plurality of flexible sheets 53A to 53C are also united (coupled) in a part of the body portion 53*c* below the upper end 53*a* (a region above the projections 43*b*1 to 43*b*3), which is described in detail later.

As illustrated in FIGS. 6A and 6B, in the present embodiment, a sheet width W of the leading end 53*b* of the flexible sheet 53 (53A to 53C) is formed to be smaller than a coil pitch H (see FIG. 3) of the inclined conveying coil 52 (conveyor) (W<H). With such a configuration, the swing of the flexible sheet 53 in conjunction with the rotation of the inclined conveying coil 52 is smoothly performed without occurrence of a failure that the flexible sheet 53 rides up on the coil portion of the inclined conveying coil 52 in a twisted state. Accordingly, the effect of preventing toner cross-linking is also efficiently performed.

With reference to FIGS. 3 and 5A, in the present embodiment, the plurality of flexible sheets 53A to 53C are arranged in parallel such that clearances D1 and D2 in the conveyance direction, which are larger than the coil pitch H (see FIG. 3) of the inclined conveying coil 52, are formed at least in an area from portions that contact the projections 43*b*1 to 43*b*3 to the leading ends 53*b* of flexible sheets adjacent to each other in the conveyance direction (D1, D2>H). The plurality of flexible sheets 53A to 53C are formed such that the clearance D2 of the second flexible sheet 53B and the third flexible sheet 53C adjacent to each other at a position corresponding to the upstream side in the conveyance direction is larger than the clearance D1 of the first flexible sheet 53A and the second flexible sheet 53B adjacent to each other at a position corresponding to the downstream side in the conveyance direction (D1<D2). Specifically, the relation of H<D1<D2 is established between the clearance D1 between the leading end 53*b* of the first flexible sheet 53A and the leading end 53*b* of the second flexible sheet 53B and the clearance D2 between the leading end 53*b* of the second flexible sheet 53B and the leading end 53*b* of the third flexible sheet 53C. In the present embodiment, the relation of H<D1a<D2a is also established between the clearance D1a between the body portion 53*c* of the first flexible sheet 53A and the body portion 53*c* of the second flexible sheet 53B and the clearance D2a between the body portion 53*c* of the second flexible sheet 53B and the body portion 53*c* of the third flexible sheet 53C.

As described above, the clearance D1 (D2) larger than the coil pitch His arranged between the first flexible sheet 53A and the second flexible sheet 53B (the second flexible sheet 53B and the third flexible sheet 53C) adjacent to each other. Accordingly, as illustrated in FIG. 6A, even when the flexible sheets 53A to 53C are deformed by the swing due to the contact with the inclined conveying coil 52, adjacent ones of the flexible sheets 53A to 53C are less likely to contact each other. Accordingly, unlike the flexible sheet 153 (a plurality of flexible sheets arranged in parallel in a comb shape without a clearance) according to a comparative example illustrated in FIG. 6B, the flexible sheets 53A to 53C do not interfere with each other, and an inconvenience that an interfered flexible sheet is flipped to generate an abnormal sound is also prevented. As described above, the inclination angle θ of the projections 43*b*1 to 43*b*3 in contact with the upstream flexible sheet 53C (53B) is larger than the inclination angle θ of the projections 43*b*1 to 43*b*3 in contact with the downstream flexible sheet 53B (53A). Accordingly, the inclination angle of the flexible sheet 53 is large, and the movable region during swinging is also large. As a result, the flexible sheet 53 is likely to contact the adjacent flexible sheet. For this reason, in the present embodiment, the clearance D2 between the second flexible sheet 53B and third flexible sheet 53C on the upstream side is set to be larger than the clearance D1 between the first flexible sheet 53A and the second flexible sheet 53B on the downstream side, so that the adjacent flexible sheets do not contact each other even when the movable region (swing range) is large.

The effect obtained by the clearances D1 and D2 (the effect of preventing adjacent flexible sheets from coming into contact with each other to prevent the generation of abnormal noise) is sufficient if the relation of H<D1<D2 (H<D1a<D2a) is established between clearances in the area from the portions that contact the projections **43*b*1 to 43*b*3 in the flexible sheets 53A to 53C to the leading ends 53*b*. Accordingly, for example, even when the portions of the body portions 53*c* from the upper ends 53*a* to the portions that contact the projections 43*b*1 to 43*b*3 are united as in the flexible sheet 53 illustrated in FIG. 5B, the same or similar effect as that of the clearances D1 and D2 as those of FIG. 5**A can be obtained.

First Modification

Figure 8A:
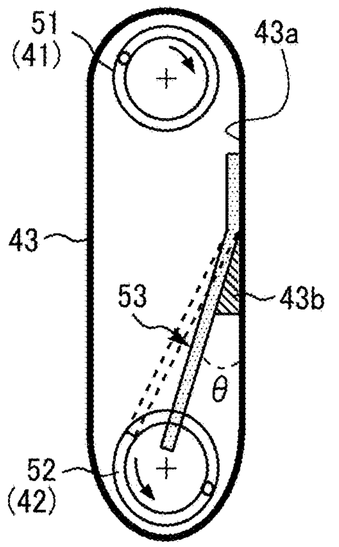
FIGS. 8A and 8B are cross-sectional views of a waste-toner conveying device according to a first modification.
Figure 8B:
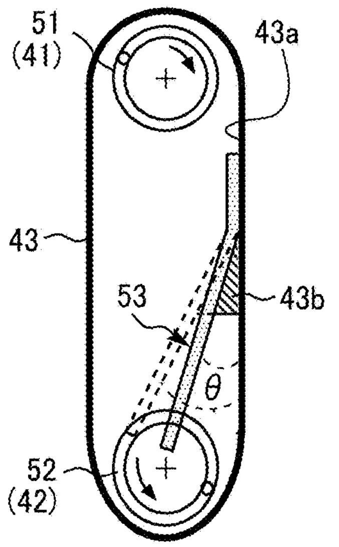

In a waste-toner conveying device 40 (toner conveying device) according to the first modification illustrated in FIG. 8A, the projection **43*b* is formed of a foamed material such as foamed polyurethane (sponge material) or an elastic material such as a rubber material. When the flexible sheet 53 that swings due to contact with the inclined conveying coil 52 is displaced from a state of being separated from the projection 43*b* (a state of being located at a position indicated by a broken line) to a state of contacting the projection 43*b* (a state of being located at a position indicated by a solid line), such a configuration can attenuate the impact against the projection 43*b*. Accordingly, such a configuration can reduce abnormal noise to be generated at the time of contact between the flexible sheet 53 and the projection 43*b*. In particular, when the projection 43*b* is made of a rubber material, the accuracy of the projection height of the projection 43*b* is easily maintained as compared with the case where the projection 43*b* is made of a foaming material. On the other hand, the projection 43*b* illustrated in FIG. 8B is formed to be always in contact with the flexible sheet 53 and is elastically deformed in conjunction with the swing of the flexible sheet 53. In other words, the projection 43*b* illustrated in FIG. 8B is in an extended state when the flexible sheet 53 is located at a position away from the projection 43*b* (the position illustrated by a broken line in FIG. 8B) and is in a shrunk state when the flexible sheet 53 is located at a position in contact with the projection 43*b* (position illustrated by a solid line). Such a configuration can reduce the vibration of the flexible sheet 53 during swinging, and thus an abnormal sound is unlikely to be generated due to the flexible sheet 53 being hit by the projection 43*b***.

Second Modification

Figure 9A:
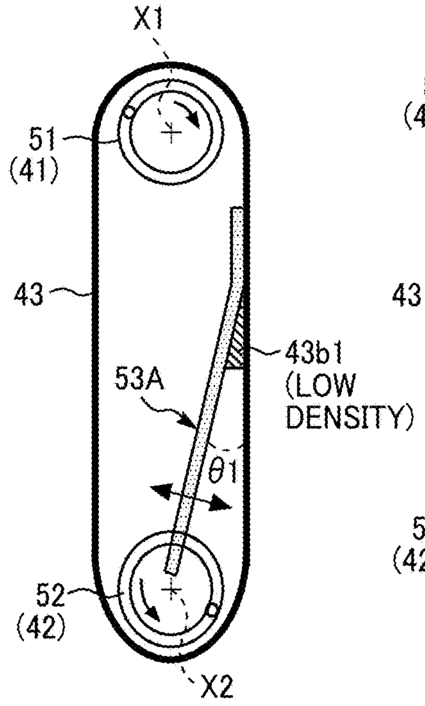
FIG. 9A is a diagram illustrating a Z1-Z1 cross section of a waste-toner conveying device according to a second modification.
Figure 9B:
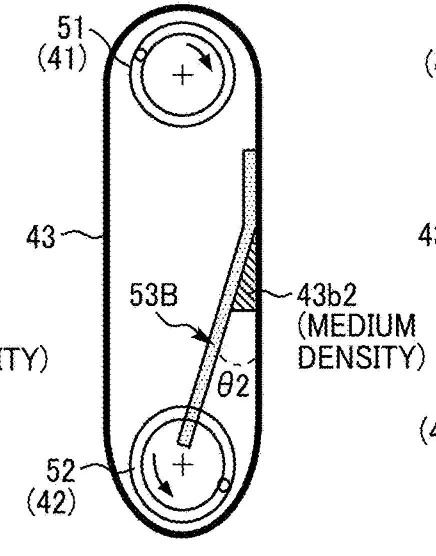
FIG. 9B is a diagram illustrating a Z2-Z2 cross section of the waste-toner conveying device according to the second modification.
Figure 9C:
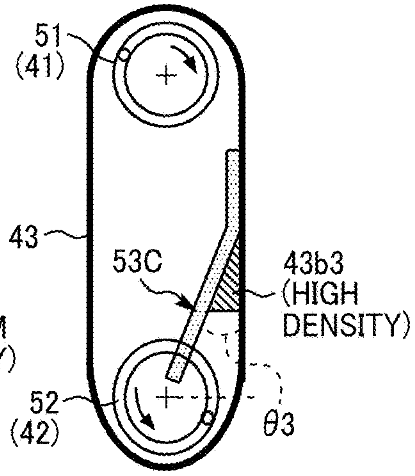
FIG. 9C is a diagram illustrating a Z3-Z3 cross section of the waste-toner conveying device according to the second modification.

As illustrated in FIGS. 9A to 9C, in a waste-toner conveying device 40 (toner conveying device) according to the second modification, the plurality of projections **43*b*1 to 43*b*3 are made of foamed polyurethane (sponge material) which is a foaming material and are formed such that a projection located at a position corresponding to the upstream side in the conveyance direction has higher foam density than a projection located at a position corresponding to the downstream side. Specifically, the foam density of the first projection 43*b*1 is set to be lower than the foam density of the second projection 43*b*2. The foam density of the second projection 43*b*2 is set to be lower than the foam density of the projection 43*b*3. The "foam density" of the foaming material is the total volume of the cells contained per unit volume. As described above, the third flexible sheet 53C (second flexible sheet 53B) on the upstream side has a larger movable range during swinging than the second flexible sheet 53B (first flexible sheet 53A) on the downstream side, and thus the impact when the third flexible sheet 53C (second flexible sheet 53B) contacts the projection 43*b* is also large. On the other hand, in the second modification, the foam density of the projection 43*b*3 (43*b*2) with which the third flexible sheet 53C (second flexible sheet 53B) on the upstream side is contacted is set to be higher than the foam density of the projection 43*b*2 (43*b*1) with which the second flexible sheet 53B (first flexible sheet 53A) on the downstream side is contacted. Thus, the impact when the third flexible sheet 53C (second flexible sheet 53B) contacts the projection 43*b*** can be reduced (i.e., the occurrence of abnormal noise due to impact can be reduced in any portion regardless of the magnitude of impact force).

Third Modification

Figure 10A:
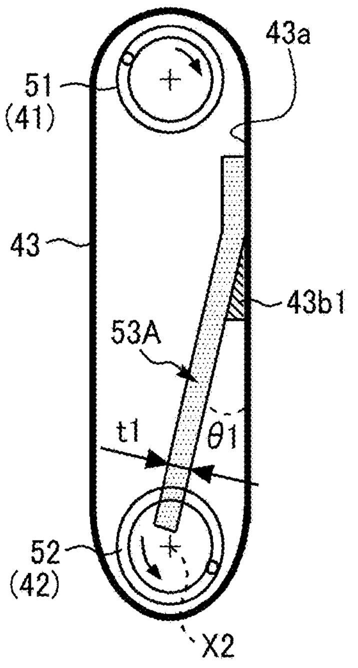
FIG. 10A is a diagram illustrating a Z1-Z1 cross section of a waste-toner conveying device according to a third modification.
Figure 10B:
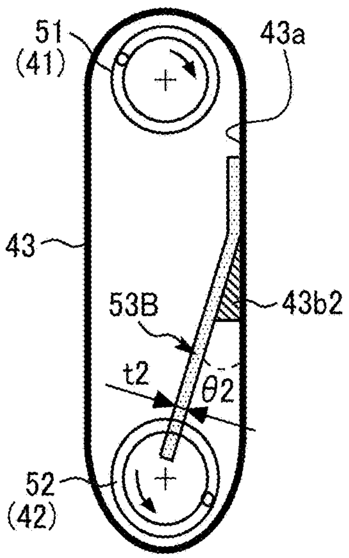
FIG. 10B is a diagram illustrating a Z2-Z2 cross section of the waste-toner conveying device according to the third modification.
Figure 10C:
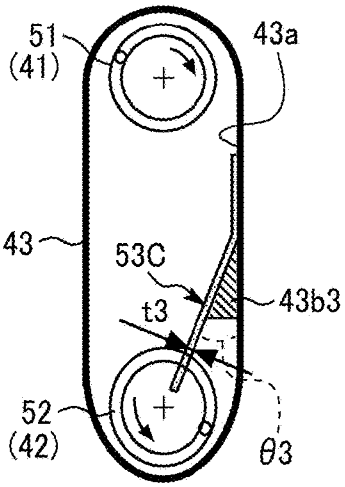
FIG. 10C is a diagram illustrating a Z3-Z3 cross section of the waste-toner conveying device according to the third modification.

As illustrated in FIGS. 10A, 10B, and 10C, in a waste-toner conveying device 40 (toner conveying device), the plurality of flexible sheets 53A to 53C are formed such that the sheet thickness of a flexible sheet located at a position corresponding to an upstream side in the conveyance direction is smaller than the sheet thickness of a flexible sheet located at a position corresponding to a downstream side in the conveyance direction. Specifically, a sheet thickness t1 of the first flexible sheet 53A on the downstream side illustrated in FIG. 10A is larger than a sheet thickness t2 of the second flexible sheet 53B on the midstream side illustrated in FIG. 10B. The sheet thickness t2 of the second flexible sheet 53B on the midstream side illustrated in FIG. 10B is larger than a sheet thickness t3 of the third flexible sheet 53C on the upstream side illustrated in FIG. 10C (t1>t2>t3). The reason for configuring as such is as follow. The first flexible sheet 53A (second flexible sheet 53B) on the downstream side is longer than the second flexible sheet 53B (third flexible sheet 53C) on the upstream side. Accordingly, in a case where the sheet thicknesses are made equal, the repulsive force when the first flexible sheet 53A on the downstream side is repelled by the inclined conveying coil 52 is smaller, and there is a possibility that the performance of preventing toner cross-linking decreases. As described above, the third flexible sheet 53C (second flexible sheet 53B) on the upstream side has a larger movable range during swinging than the second flexible sheet 53B (first flexible sheet 53A) on the downstream side, and thus the impact when the third flexible sheet 53C (second flexible sheet 53B) contacts the projection **43*b* is also large. On the other hand, in the third modification, a sheet thickness t3 (t2) of the third flexible sheet 53C (second flexible sheet 53B) on the upstream side is set to be smaller than a sheet thickness t2 (t1) of the second flexible sheet 53B (first flexible sheet 53A) on the downstream side, so that the impact when the third flexible sheet 53C (second flexible sheet 53B) contacts the projection 43*b* can be reduced (i.e., the impact force is equalized at any portion, and the occurrence of abnormal noise can be reduced). Note that in the third modification, the sheet thicknesses t1 to t3 of the plurality of flexible sheets 53A to 53C are different so that the above-described effects are achieved. On the other hand, flexible sheets having the same thickness and materials are prepared, and the number of flexible sheets to be laminated may be different between the flexible sheets 53A to 53**C so that the sheet thicknesses t1 to t3 be different. Thus, the above-described effect can also be achieved.

Fourth Modification

Figure 11A:
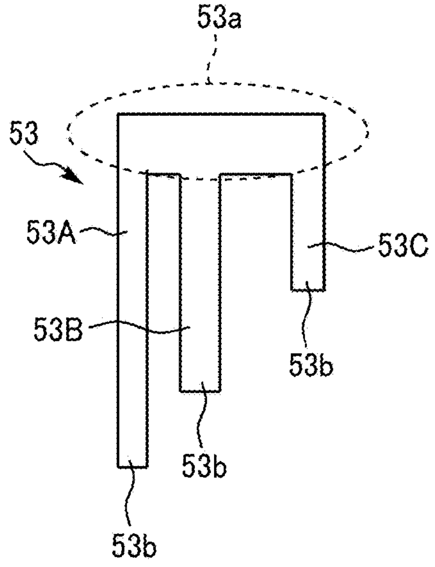
FIGS. 11A and 11B are front views of flexible sheets according to a fourth modification.
Figure 11B:
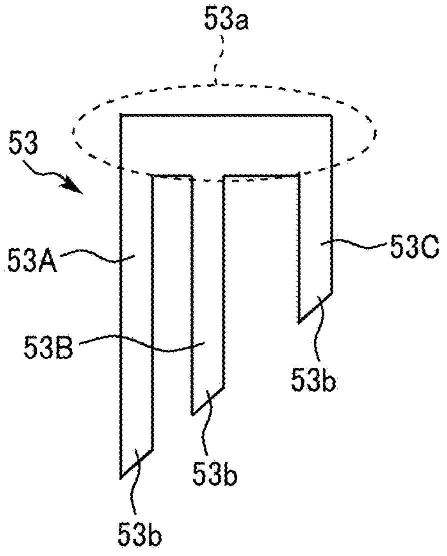

As illustrated in FIG. 11A, the flexible sheet 53 (53A to 53C) according to the fourth modification is formed such that the leading end **53*b* is formed to have a straight shape without being bent from the body portion 53*c*. In the flexible sheet 53 (53A to 53C) illustrated in FIG. 11B, the leading end 53***b* having a straight shape has a taper to extend along the rotation center X2 of the inclined conveying coil 52 (the leading end 53*b* is diagonally cut). As described above with reference to FIGS. 5A and 5B, such a configuration may cause a failure that the flexible sheet 53 rides up on the coil portion in a twisted state when the flexible sheet 53 swings in conjunction with rotation of the inclined conveying coil 52, as compared with the flexible sheet 53 in which the leading end 53*b* is formed to be bent from the body portion 53*c*. However, the flexible sheet 53 swings as it is so that toner cross-linking is reduced to some extent. The plurality of flexible sheets 53A to 53C are provided with appropriate clearances D1 and D2 between adjacent flexible sheets thereof, so that the occurrence of the abnormal sound can be reduced.

As described above, the waste-toner conveying device 40 (toner conveying device) according to the present embodiment includes the drop conveyance passage 43, the inclined conveyance passage 42, and the inclined conveying coil 52 (conveyor) having a coil shape or a screw shape. Toner drops by its own weight through the drop conveyance passage 43. The inclined conveyance passage 42 communicates with a lower end of the drop conveyance passage 43 and extends obliquely downward. The conveyor (inclined conveying coil 52) having a coil shape or a screw shape is disposed in the inclined conveyance passage 42 and rotates in a specified direction to convey toner obliquely downward. The flexible sheet 53 that swings in conjunction with rotation of the inclined conveying coil 52 is disposed in the drop conveyance passage 43 such that the leading end 53*b* of the flexible sheet 53 is contactable with the inclined conveying coil 52. The projection 43*b* that inclines the leading end 53*b* of the flexible sheet 53 is disposed in a direction away from the inner wall 43*a* such that the leading end 53*b* of the flexible sheet 53 is directed to the rotation center X2 of the conveyor (inclined conveying coil 52). The plurality of flexible sheets 53A to 53C are disposed such that the plurality of leading ends 53*b* are arranged along the conveyance direction of the inclined conveying coil 52. The plurality of projections 43*b*1 to 43*b*3 are disposed to correspond to the flexible sheets 53A to 53C, respectively. The plurality of projections 43*b*1 to 43*b*3 are formed such that the height of a projection located at a position corresponding to an upstream side in the conveyance direction is larger than the height of a projection located at a position corresponding to a downstream side in the conveyance direction. The plurality of flexible sheets 53A to 53C are arranged in parallel such that the clearances D1 and D2 in the conveyance direction, which are larger than the coil pitch H (see FIG. 3) of the inclined conveying coil 52, are formed at least in the area from the portions that contact the projections 43*b* to the leading ends 53*b* of flexible sheets adjacent to each other in the conveyance direction. The plurality of flexible sheets 53A to 53C are formed such that the clearance D2 of the second flexible sheet 53B and the third flexible sheet 53C adjacent to each other at a position corresponding to the upstream side in the conveyance direction is larger than the clearance D1 of the first flexible sheet 53A and the second flexible sheet 53B adjacent to each other at a position corresponding to the downstream side in the conveyance direction. With such a configuration, even in a case where the inclined conveyance passage 42 extending obliquely downward is disposed to communicate with the lower end of the drop conveyance passage 43, the occurrence of the abnormal sound can be reduced, and the cross-linking of the toner is less likely to occur.

In the above-described embodiments, the present disclosure is applied to the waste-toner conveying device 40 (toner conveying device) in which the untransferred toner collected by the cleaning device 15 or the intermediate transfer belt cleaner 9 is conveyed as waste toner toward the waste-toner collection container 30. However, the present disclosure is not limited to the above-described embodiments, and can readily be applied to, for example, a waste-toner conveying device 40 in which only untransferred toner collected in the cleaning device 15 for the photoconductor drum 11 is conveyed as waste toner toward the waste-toner collection container 30. In the above-described embodiments, the present disclosure is applied to the waste-toner conveying device 40 (toner conveying device) in which waste toner as toner is conveyed. However, the present disclosure is not limited to the above-described embodiments, and can readily be applied to, for example, a toner conveying device in which the untransferred toner collected by the cleaning device 15 is conveyed as recycle toner toward the developing device 13, a toner conveying device in which fresh toner or two-component developer is conveyed toward the developing device 13. Although the present disclosure is applied to the waste-toner conveying device 40 (toner conveying device) provided with the horizontal conveyance passage 41 in the present embodiment, the present disclosure can also be applied to a toner conveying device including the drop conveyance passage 43 and the inclined conveyance passage 42 without the horizontal conveyance passage 41, a toner conveying device provided with another conveyance passage (e.g., an inclined conveyance passage) instead of the horizontal conveyance passage 41. Such cases also provide substantially the same effects as the effects described above.

In the present embodiment, the inclined conveying coil 52 (conveyor having a coil shape) is disposed in the inclined conveyance passage 42. However, an inclined conveying screw (conveyor having a screw shape) may be disposed in the inclined conveyance passage 42 instead of the inclined conveying coil 52 (conveyor having a coil shape). Specifically, the inclined conveying screw may be a screw in which a screw portion is spirally wound at a specified screw pitch around a shaft extending in the rotation axis direction over substantially the entire area of the inclined conveyance passage 42. In the present embodiment, the horizontal conveying coil 51 (second conveyor having a coil shape) is disposed in the horizontal conveyance passage 41. However, a horizontal conveying screw (second conveyor having a screw shape) may be disposed in the horizontal conveyance passage 41 instead of the horizontal conveying coil 51 (second conveyor having a coil shape). Specifically, the horizontal conveying screw may be a screw in which a screw portion is spirally wound at a specified screw pitch around a shaft extending in the rotation axis direction over substantially the entire area of the horizontal conveyance passage 41. Such cases also provide substantially the same effects as the effects described above.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

Aspects of the present disclosure may be, for example, combinations of first to fifteenth aspects as follows.

First Aspect

A toner conveying device (e.g., the waste-toner conveying device 40) includes a drop conveyance passage (e.g., the drop conveyance passage 43), an inclined conveyance passage (e.g., the inclined conveyance passage 42), a conveyor (e.g., the inclined conveying coil 52) having a coil shape or a screw shape, and a plurality of flexible sheet (e.g., the flexible sheet 53A, 53B, 53C). Toner falls through the drop conveyance passage by own weight of the toner. The inclined conveyance passage communicates with a lower end of the drop conveyance passage and extends obliquely downward. The conveyor has a coil shape or a screw shape and is disposed in the inclined conveyance passage to rotate in a predetermined direction to convey the toner obliquely downward. Each of the plurality of flexible sheet has a leading end (e.g., the leading end 53*b*) to contact the conveyor to swing in conjunction with rotation of the conveyor. The leading ends of the plurality of flexible sheets are arranged side by side along a conveyance direction in which the conveyor conveys the toner. Adjacent ones of the plurality of flexible sheets adjacent to each other in the conveyance direction are arranged side by side with a clearance (e.g., the clearance D1, D2) in the conveyance direction larger than a coil pitch (e.g., the coil pitch H) or a screw pitch of the conveyor. The clearance is larger between adjacent ones of the plurality of flexible sheets adjacent to each other at a position corresponding to an upstream side in the conveyance direction than between adjacent ones of the plurality of flexible sheets adjacent to each other at a position corresponding to a downstream side in the conveyance direction.

Second Aspect

The toner conveying device (e.g., the waste-toner conveying device 40) according to the first aspect has a plurality of projections (e.g., the projection 43*b*1, 43*b*2, 43*b*3). The plurality of projections inclines the leading ends (e.g., the leading end 53*b*) of the plurality of flexible sheets (e.g., the flexible sheet 53A, 53B, 53C) in a direction away from an inner wall (e.g., the inner wall 43*a*) of the drop conveyance passage (e.g., the drop conveyance passage 43) to direct the leading ends of the plurality of flexible sheets to a rotation center (e.g., the rotation center X2) of the conveyor (e.g., the inclined conveying coil 52). A height of a projection of the plurality of projections located at a position corresponding to an upstream side in the conveyance direction is greater than a height of a projection of the plurality of projections located at a position corresponding to a downstream side in the conveyance direction.

Third Aspect

In the toner conveying device (e.g., the waste-toner conveying device 40) according to the first or second aspect, each of the flexible sheet (e.g., the flexible sheet 53A, 53B, 53C) has an upper end (e.g., the upper end 53*a*), a body portion (e.g., the body portion 53*c*), and a leading end (e.g., the leading end 53*b*). The upper end as a fixed end is fixed on the inner wall (e.g., the inner wall 43*a*) of the drop conveyance passage (e.g., the drop conveyance passage 43). The body portion extends vertically downward from the upper end. The leading end bends, along an inclination of the coil shape or the screw shape of the conveyor (e.g., the inclined conveying coil 52) with respect to the rotation center (e.g., the rotation center X2), from a lower end of the body portion.

Fourth Aspect

In the toner conveying device (e.g., the waste-toner conveying device 40) according to any one of the first to third aspects, the clearance (e.g., the clearance D1, D2) is a clearance between the leading ends (e.g., the leading end 53*b*) of adjacent ones of the plurality of flexible sheets (e.g., the flexible sheet 53A, 53B, 53C) adjacent to each other in the conveyance direction.

Fifth Aspect

In the toner conveying device (e.g., the waste-toner conveying device 40) according to the third aspect, the clearance (e.g., the clearance D1, D2) is a clearance between the body portions (e.g., the body portion 53*c*) of adjacent ones of the plurality of flexible sheets (e.g., the flexible sheet 53A, 53B, 53C) adjacent to each other in the conveyance direction.

Sixth Aspect

In the toner conveying device (e.g., the waste-toner conveying device 40) according to the second aspect, the plurality of projections (e.g., the projection 43*b*1, 43*b*2, 43*b*3) are made of an elastic material.

Seventh Aspect

In the toner conveying device (e.g., the waste-toner conveying device 40) according to the sixth aspect, the plurality of projections (e.g., the projection 43*b*1, 43*b*2, 43*b*3) are in contact with the plurality of flexible sheets (e.g., the flexible sheet 53A, 53B, 53C) to elastically deform in conjunction with swinging of the flexible sheets.

Eighth Aspect

In the toner conveying device (e.g., the waste-toner conveying device 40) according to the sixth aspect, the elastic material is a rubber material.

Ninth Aspect

In the toner conveying device (e.g., the waste-toner conveying device 40) according to the second aspect, the plurality of projections (e.g., the projection 43*b*1, 43*b*2, 43*b*3) are made of a foaming material, and the projection located at the position corresponding to the upstream side in the conveyance direction has a higher foam density than the projection located at the position corresponding to the downstream side in the conveyance direction.

Tenth Aspect

In the toner conveying device (e.g., the waste-toner conveying device 40) according to the second aspect, the plurality of flexible sheets (e.g., the flexible sheet 53A, 53B, 53C) have different sheet lengths. The plurality of projections (e.g., the projection 43*b*1, 43*b*2, 43*b*3) are made of a foaming material. A projection corresponding to a flexible sheet having a shorter sheet length among the plurality of flexible sheets has a higher foam density than a projection corresponding to a flexible sheet having a longer sheet length among the plurality of flexible sheets.

Eleventh Aspect

In the toner conveying device (e.g., the waste-toner conveying device 40) according to the second aspect, among the plurality of flexible sheets (e.g., the flexible sheets 53A, 53B, 53C), a sheet thickness of a flexible sheet located at a position corresponding to an upstream side in the conveyance direction is smaller than a sheet thickness of a flexible sheet located at a position corresponding to a downstream side in the conveyance direction.

Twelfth Aspect

In the toner conveying device (e.g., the waste-toner conveying device 40) according to the second aspect, the plurality of flexible sheets (e.g., the flexible sheets 53A, 53B, 53C) have different sheet lengths. A sheet thickness of a flexible sheet having a shorter sheet length among the plurality of flexible sheets is smaller than a sheet thickness of a flexible sheet having a longer sheet length among the plurality of flexible sheets.

Thirteenth Aspect

In the toner conveying device (e.g., the waste-toner conveying device 40) according to any one of the first to twelfth aspects, a sheet width of the leading end (e.g., the leading end 53*b*) of each of the plurality of flexible sheets (e.g., the flexible sheets 53A, 53B, 53C) is smaller than the coil pitch (e.g., the coil pitch H) or the screw pitch of the conveyor (e.g., the inclined conveying coil 52).

Fourteenth Aspect

The toner conveying device (e.g., the waste-toner conveying device 40) according to the first to thirteenth aspects further includes a horizontal conveyance passage (e.g., the horizontal conveyance passage 41) and a second conveyor (e.g., the horizontal conveying coil 51). The horizontal conveyance passage communicates with an upper end of the drop conveyance passage (e.g., the drop conveyance passage 43) and extends in a horizontal direction. The second conveyor has a coil shape or a screw shape and is disposed in the horizontal conveyance passage to rotate in a specified direction to convey the toner in the horizontal direction.

Fifteenth Aspect

An image forming apparatus (e.g., the image forming apparatus 1) includes the toner conveying device (e.g., the waste-toner conveying device 40) according to any one of the first to fourteenth aspects.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A toner conveying device comprising:

a drop conveyance passage through which toner falls by own weight of the toner;

an inclined conveyance passage communicating with a lower end of the drop conveyance passage and extending obliquely downward;

a conveyor having a coil shape or a screw shape and disposed in the inclined conveyance passage to rotate in a predetermined direction to convey the toner obliquely downward; and a plurality of flexible sheets each having a leading end to contact the conveyor to swing in conjunction with rotation of the conveyor, the leading ends of the plurality of flexible sheets arranged side by side along a conveyance direction in which the conveyor conveys the toner, wherein adjacent ones of the plurality of flexible sheets adjacent to each other in the conveyance direction are arranged side by side with a clearance in the conveyance direction larger than a coil pitch or a screw pitch of the conveyor, and wherein the clearance is larger between adjacent ones of the plurality of flexible sheets adjacent to each other at a position corresponding to an upstream side in the conveyance direction than between adjacent ones of the plurality of flexible sheets adjacent to each other at a position corresponding to a downstream side in the conveyance direction.

2. The toner conveying device according to claim 1, further comprising a plurality of projections arranged corresponding to the plurality of flexible sheets to incline the leading ends of the plurality of flexible sheets in a direction away from an inner wall of the drop conveyance passage to direct the leading ends of the plurality of flexible sheets to a rotation center of the conveyor, wherein a height of a projection of the plurality of projections located at a position corresponding to an upstream side in the conveyance direction is greater than a height of a projection of the plurality of projections located at a position corresponding to a downstream side in the conveyance direction.

3. The toner conveying device according to claim 2, wherein each of the plurality of flexible sheets has:

an upper end fixed on the inner wall of the drop conveyance passage;

a body portion extending vertically downward from the upper end; and the leading end to bend, along an inclination of the coil shape or the screw shape of the conveyor with respect to the rotation center, from a lower end of the body portion.

4. The toner conveying device according to claim 3, wherein the clearance is a clearance between the leading ends of adjacent ones of the plurality of flexible sheets adjacent to each other in the conveyance direction.

5. The toner conveying device according to claim 3, wherein the clearance is a clearance between the body portions of adjacent ones of the plurality of flexible sheets adjacent to each other in the conveyance direction.

6. The toner conveying device according to claim 2, wherein the plurality of projections are made of an elastic material.

7. The toner conveying device according to claim 6, wherein the plurality of projections are in contact with the plurality of flexible sheets to elastically deform in conjunction with swinging of the flexible sheets.

8. The toner conveying device according to claim 6, wherein the elastic material is a rubber material.

9. The toner conveying device according to claim 2, wherein the plurality of projections are made of a foaming material, and the projection located at the position corresponding to the upstream side in the conveyance direction has a higher foam density than the projection located at the position corresponding to the downstream side in the conveyance direction.

10. The toner conveying device according to claim 2, wherein the plurality of flexible sheets have different sheet lengths, wherein the plurality of projections are made of a foaming material, and wherein a projection corresponding to a flexible sheet having a shorter sheet length among the plurality of flexible sheets has a higher foam density than a projection corresponding to a flexible sheet having a longer sheet length among the plurality of flexible sheets.

11. The toner conveying device according to claim 2, wherein, among the plurality of flexible sheets, a sheet thickness of a flexible sheet located at a position corresponding to an upstream side in the conveyance direction is smaller than a sheet thickness of a flexible sheet located at a position corresponding to a downstream side in the conveyance direction.

12. The toner conveying device according to claim 2, wherein the plurality of flexible sheets have different sheet lengths, and wherein a sheet thickness of a flexible sheet having a shorter sheet length among the plurality of flexible sheets is smaller than a sheet thickness of a flexible sheet having a longer sheet length among the plurality of flexible sheets.

13. The toner conveying device according to claim 1, wherein a sheet width of the leading end of each of the plurality of flexible sheets is smaller than the coil pitch or the screw pitch of the conveyor.

14. The toner conveying device according to claim 1, further comprising:

a horizontal conveyance passage communicating with an upper end of the drop conveyance passage and extending in a horizontal direction; and another conveyor having a coil shape or a screw shape and disposed in the horizontal conveyance passage to rotate in a specified direction to convey the toner in the horizontal direction.

15. An image forming apparatus comprising the toner conveying device according to claim 1.

* * * * *